(12) United States Patent
Kasper et al.

(10) Patent No.: US 7,508,824 B2
(45) Date of Patent: Mar. 24, 2009

(54) METHOD AND SYSTEM FOR TRANSMITTING DATA VIA SWITCHABLE DATA NETWORKS

(75) Inventors: Michael Kasper, Nuremberg (DE);
Karl-Heinz Krause, Nuremberg (DE);
Ulrich Sinn, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 700 days.

(21) Appl. No.: 10/982,856

(22) Filed: Nov. 8, 2004

(65) Prior Publication Data
US 2005/0169262 A1 Aug. 4, 2005

Related U.S. Application Data
(63) Continuation of application No. PCT/DE03/01467, filed on May 7, 2003.

(30) Foreign Application Priority Data
Mar. 7, 2002 (DE) ............................. 102 20 334

(51) Int. Cl.
*H04L 12/50* (2006.01)
(52) U.S. Cl. ...................................... 370/386; 370/412
(58) Field of Classification Search ...................... None
See application file for complete search history.

(56) References Cited

U.S. PATENT DOCUMENTS 5,654,969 A 8/1997 Wilhelmsson
6,339,584 B1 1/2002 Gross et al.
2002/0131454 A1* 9/2002 Franke et al. ................ 370/503
2006/0062211 A1* 3/2006 Manthoulis et al. ......... 370/386

FOREIGN PATENT DOCUMENTS

EP 1 001 573 A2 5/2000

OTHER PUBLICATIONS

Fernanda Gusmao De Lima, et al, "A Frame Stream Controller IP", IEEE International Symposium on Circuits and Systems, pp. V-721-V-724, Geneva Switzerland, May 28, 2000.
Srikant Sharma, et al, "Implementation Experiences of Bandwidth Guarantee on a Wireless Lan", Multimedia Computing and Networking, vol. 4673, pp. 16-27, Jan 23, 2002, San Jose, CA.
Hirschmann Network Systems, "White Paper—Real Time Services (QOS) in Ethernet Based Industrial Automation Networks", pp. 1-56, Nov. 20, 2000.
IEC 61491, EN 61491 System Interface, Sercos Interface—Technical Short Description (http://www.sercos.com), Jun. 1999.

* cited by examiner

*Primary Examiner*—Duc C Ho
(74) *Attorney, Agent, or Firm*—Sughrue Mion, PLLC (57) ABSTRACT

A method and a system for transmitting data over a switchable network, especially Ethernet, in the field of industrial installations, in which real-time critical data and non real-time critical data is transmitted. The switchable data network has at least one wireless transmission link between at least two users, especially a transmitter and a receiver. When a communication interface is created by way of a coupling unit of the data network between cyclically clocked communication connections differing in performance, the data is forwarded according to a "store and forward" method. The method and system enable a parallel transmission of real-time critical and non real-time critical data.

68 Claims, 6 Drawing Sheets

FIG 2

12. Transmission Cycle
13. First Part
14. Second Part
15. Data Packets for Organizing Transmission
16. Data Packet
17. Duration

FIG 3

18, 19, 36. Users
20, 21. Coupling Units
22, 23. Interfaces
24, 25. Local Memories
26, 27. Control Units
28, 29. Internal Data Connections
30, 31. External Ports
32-35. Data Connections
37, 38. External Ports

FIG 4

| | |
|---|---|
| 39. | User |
| 40. | Coupling Unit |
| 41. | Local Memory |
| 42, 43. | Logic Interfaces |
| 44, 45. | Drivers |
| 46, 47. | Communication Channels |
| 48. | Real-time Critical Apps. |
| 49. | Non- Real-time Critical Apps. |

FIG 5

METHOD AND SYSTEM FOR TRANSMITTING DATA VIA SWITCHABLE DATA NETWORKS

This is a Continuation of International Application PCT/DE03/01467, with an international filing date of May 7, 2003, which was published under PCT Article 21(2) in German, and the disclosure of which is incorporated into this application by reference.

FIELD OF AND BACKGROUND OF THE INVENTION

The invention relates to a method and a system for transmitting data over switchable data networks, particularly Ethernet in the field of industrial installations, in which real-time critical and non real-time critical data are transmitted. The switchable data network has at least one wireless transmission link between at least two users, particularly a transmitter and a receiver.

Data networks enable communication between a plurality of users through networking, i.e., the connection of individual users among each other. Communication is the transmission of data between the users. The data to be transmitted are sent as data messages, i.e., the data are combined into a plurality of packets and are transmitted in this form to the corresponding receiver over the data network. Hence they are also referred to as data packets. The term data transmission as used in this document is completely synonymous with the aforementioned transmission of data messages or data packets. Networking per se is implemented, for example, in switchable high-performance data networks, particularly Ethernet, by inserting at least one coupling unit between two users, which is connected to both users. Each coupling unit may be connected to more than two users. If the user is integrated in a coupling unit, it is also possible that the coupling unit is only connected with another coupling unit or with another user, i.e., it may be a terminal. Each user is connected to at least one coupling unit but is not directly connected to another user. Users are, for example, computers, stored program controllers (SPCs) or other machines, which exchange electronic data with other machines and, in particular, process data of other machines. Transmission links between two coupling units, or between a coupling unit and a user, can be wirebound or wireless. Wireless transmission of data may be effected, for example, by radio or infrared light. If the data network has only wireless transmission links it is called a wireless network, if it has both wireless and wire-bound transmission links, it is referred to as a heterogeneous network. In contrast to bus systems, in which each user can reach every other user of the data network directly via the data bus, switchable data networks only have point-to-point connections as transmission links. In other words, a user can only indirectly reach all the other users of the switchable data network by forwarding the data to be transmitted through one or more coupling units.

In distributed automation systems, e.g., in the field of drive engineering, specific data must reach and be processed by the intended users at specific times. One speaks of real-time critical data or data traffic because the failure of the data to arrive at the destination in time leads to undesirable consequences in the user. Successful real-time critical data traffic of the above-described type can be ensured in distributed automation systems according to IEC 61491, EN61491 SERCOS Interface—Brief Technical Description (http://www.sercos.de/deutsch/index_deutsch.htm).

It is likewise known in the related art to use a synchronously clocked communication system with equidistant characteristics in an automation system of this type. This is a system having at least two users that are interconnected via a data network for the purpose of mutually exchanging or transmitting data.

The data are exchanged cyclically in equidistant communication cycles, which are predetermined by the communication clock used by the system. Users are, for example, central automation devices, programming, configuration or control units, peripheral units, such as input/output modules, drives, actuators, sensors, stored program controllers (SPCs) or other control units, computers or machines that exchange electronic data with other machines and, in particular, process data of other machines. The term control units as used hereinafter means open loop or closed loop control units of any type. The data networks used are, for example, bus systems, e.g., field bus, Profibus, Ethernet, Industrial Ethernet, FireWire or PC-internal bus systems (PCI), etc.

Today, automation components (e.g., controllers, drives, etc.) generally have an interface to a cyclically clocked communication system. One processing level of the automation component (fast cycle) (e.g., position control in a control system, torque control of a drive) is synchronized to the communication cycle. This determines the communication clock. Other low-performance algorithms (slow cycle) (e.g., temperature controls) of the automation component can also only communicate with other components (e.g., binary switches for fans, pumps, etc.) by this communication clock, although a slower cycle would be sufficient. The use of a single communication clock for transmitting all the information created in the system places high demands on the bandwidth of the transmission link.

For communication on every process or automation level, prior art system components use only a single communication system or cycle (fast cycle) and its clock to transmit all relevant information. Data that are required only in the slow cycle can be transmitted in stages, e.g. using additional protocols, to limit the demands on the bandwidth. This results in additional software complexity in the automation components. Furthermore, both the bus bandwidth and the minimum possible communication cycle in the entire system are determined by the low-performance component.

OBJECTS OF THE INVENTION

An object of the invention is to provide a system and a method for transmitting data over heterogeneous switchable data networks, particularly Ethernet, which enable mixed operation of real-time critical and non real-time critical data, particularly Internet-based or intranet-based data communication in the same data network.

SUMMARY OF THE INVENTION

The object may be attained by a method for transmitting data over switchable data networks, particularly Ethernet, in the field of industrial installations, in which real-time critical and non real-time critical data are transmitted. The method may comprise:

transmitting the data in at least one transmission cycle with an adjustable duration, each transmission cycle divided into at least one first part for transmitting real-time critical data for real-time control and at least one second part for transmitting non real-time critical data; and establishing a communication interface between a first communication connection on a first transmission link with a first transmission cycle of a first length and a second communication connection on a second transmission link with a second transmission cycle of a second length, said establishment comprising:

fully receiving a data packet according to a first receive list assigned to the first transmission cycle, temporarily storing the fully received data packet, and transmitting the data packet according to a transmit list assigned to the second transmission cycle, wherein the first and the second communication connections have equidistant characteristics.

The invention is based on the recognition that open Internet based communication is spontaneous communication, i.e., neither the time of this type of communication nor the resulting data volume to be transferred can be determined in advance. It is therefore not possible to exclude collisions in the coupling units of switchable high-speed networks, particularly Fast Ethernet or Switched Ethernet. It is desirable to be able to use the advantages offered by Internet communication technology even with real-time communication in switchable data networks in the field of automation technology, particularly drive engineering, mixed real-time and other spontaneous non real-time communication, particularly Internet communication. This is made possible in that the real-time communication, which is primarily cyclical in the fields of application being considered here and can thus be planned in advance, is strictly separated from non-plannable non real-time communication, particularly open Internet based communication.

Communication between users takes place in transmission cycles. Each transmission cycle is divided into at least one first part for transmitting real-time critical data for real-time control of, e.g., the corresponding industrial installation, and at least one second part for transmitting non real-time critical data, e.g., open Internet compatible communication. In a particularly advantageous embodiment of the invention, each user is assigned a coupling unit which is provided for transmitting and/or receiving and/or forwarding the data to be transmitted.

In heterogeneous switchable data networks, i.e., data networks having transmission links for both wireless and wire-bound data transmission, it is necessary to interconnect transmission links that differ in both their physical characteristics and often also in their capacity. Data transmission links with wireless data transmission usually have a lower data transmission rate than wire-bound transmission links. For example, the IEEE 802.11 a radio communication network has a gross data rate of 54 Mb/s, while Ethernet already reaches a gross data rate of 1 Gb/s for wire-bound transmission. Wireless transmission links, particularly via radio, work with cycle times which for physical reasons, e.g. due to characteristics of the high-frequency circuits used, can be clearly above the cycle times possible with wire-bound data transmission. Existing communication connections on transmission links that differ in at least one of the above points are hereinafter referred to as differing in performance. Thus, one exemplary embodiment of the invention uses a communication interface in a coupling unit for connecting a first transmission link with wireless data transmission and a second transmission link with wire-bound data transmission. The communication interface is provided between a first communication connection on the first transmission link with a first transmission cycle of a first length and a second communication connection on the second transmission link with a second transmission cycle of a second length. The communication interface has an electronic circuit with a receive list for the first transmission cycle and a transmit list for the second transmission cycle, such that a data packet received according to the receive list is assigned to an element of the transmit list. The electronic circuit further has a receive buffer, a transmit buffer and an intermediate memory for data packets that have been fully received according to the receive list and data packets to be transmitted according to the transmit list. Both the receive buffer and the transmit buffer can be connected to the intermediate memory. Such a communication interface between cyclically clocked communication connections differing in performance makes it possible, for example, to interconnect wireless and wire-bound transmission links having different transmission characteristics. Particularly in an automation system, such a communication interface makes it possible to operate a data network with communication connections differing in performance, the characteristics of which are adapted to the respective application.

For example, a low-performance communication interface can be provided for slow input/output modules, such that the modules can communicate with the associated processing level in the in the control system via a corresponding interface.

A particular advantage is that it enables the combination of data packets of different communication connections with different transmission rates and/or different communication cycles on the coupling node level without requiring an application program on a higher logic level. This is advantageous, particularly for a communication interface module, a so-called switch ASIC. This communication interface module can have a plurality of separate ports for different communication connections.

Another particular advantage of the invention is that it enables a consistent exchange of real-time data in a deterministic communication system of different partial networks, each having different transmission rates and/or communication cycles. For the consistent transmission of real-time data it is decisive that the data are assigned to a specific transmission cycle, including beyond the communication interface between the individual partial networks. The invention enables such a fixed assignment of real-time data to specific transmission cycles beyond the boundaries of the partial networks.

In another exemplary embodiment of the invention, the consistent data exchange takes place via an intermediate buffer. This means that the receive port always writes the data to the common intermediate buffer and the transmit port retrieves the data from the intermediate buffer at the corresponding transmit instant. In addition, each port can have a transmit and a receive buffer. In this case, the depth of the transmit and receive buffers must be at least sufficient to accommodate a data packet of a maximum packet length. Only when the data packet has been fully received at the receive port are the data copied into the common intermediate memory. For transmission, the data are copied from the intermediate memory to the transmit buffer of the transmit port.

According to yet another exemplary embodiment of the invention, an access controller of the common intermediate memory ensures that no overtaking can occur during reading from and writing to the intermediate memory.

It is particularly advantageous that only one standard communication interface needs to be implemented at a coupling node and that no additional entity is necessary to recopy the data between the different communication interfaces.

A further advantage of the invention is that it makes it possible to realize an automation system with partial networks differing in performance, particularly for use in packing machines, presses, plastic extruders, textile machines, printing machines, machine tools, robots, handling systems, wood working machines, glass processing machines, ceramic processing machines, hoists and heterogeneous switchable data networks.

A particularly advantageous embodiment of the invention is characterized in that all the users and coupling units of the switchable data network are always time synchronized to a common synchronous time basis. This is a prerequisite for separating the plannable real-time communication and the non-plannable non real-time critical communication. The separation of the plannable real-time communication from the non-plannable non real-time critical communication is ensured through the time synchronization method described in German publication DE 100 04 425. By using this method on a permanent basis, including during ongoing operation of a distributed automation system, all the users and coupling units of the switchable data network are always synchronized to a common time basis, which means that each transmission cycle has the same starting point for all the users and coupling units. Due to the cyclical operation, all the real-time critical data transmissions are known before the data is actually transmitted and can therefore be planned in advance. As a result, the real-time communication can be controlled for all the users and coupling units, so that no interference, particularly no collisions occur during transmission of the real-time critical data packets themselves, and all the planned critical data transfer instants are strictly adhered to.

In a further embodiment of the invention, all non real-time critical data that are to be transmitted during the part of a transmission cycle provided for real-time critical communication are buffered by the corresponding coupling unit and are transmitted during the part provided for non real-time critical communication of this or a subsequent transmission cycle. In other words, any unplanned Internet communication that may occur in the first part of a transmission cycle, which is reserved for real-time communication is shifted to the second part of the transmission cycle, which is reserved for spontaneous non real-time critical communication, so that interference with real-time communication is completely avoided. The corresponding data of the spontaneous non real-time critical communication are buffered by the coupling unit involved and are transmitted only in the second part of the transmission cycle provided for spontaneous non real-time critical communication, after the part for real-time communication has elapsed. This second part, i.e., the entire duration until the end of the transmission cycle is available to all the users for non-plannable non real-time critical communication, particularly Internet communication, again without influencing the real-time communication, because the latter is carried out at a different time.

Collisions with the real-time critical data packets in the coupling units can be avoided in that all non real-time critical data that cannot be transmitted during the part of a transmission cycle provided for the transmission of non real-time critical data are buffered by the respective coupling unit and are transmitted during the part of a later transmission cycle provided for transmitting non real-time critical data.

A further exemplary embodiment of the invention is characterized in that the duration of the part within a transmission cycle for transmitting non real-time critical data is automatically determined by the duration of the part for transmitting real-time critical data. The advantage of this arrangement is that only the transmission time necessary for the real-time critical data traffic is used and the remaining time is automatically available for non real-time critical communication, e.g., for non-plannable Internet communication or other non real-time critical applications. It is particularly advantageous that the duration of the part within a transmission cycle for transmitting real-time critical data is determined by the data to be transmitted in a connection-specific manner, i.e., the time period of the two parts is determined for each individual data connection by the respectively necessary data volume of the real-time critical data to be transmitted. As a result, the two parts are optimally divided and the time available for non real-time critical communication is optimized for each individual data connection between two coupling units for each transmission cycle.

Another embodiment of the invention is characterized in that the duration of a transmission cycle is determined at least once before the respective data transmission is executed. This has the advantage that with each start of a new data transmission planned in advance, the duration of a transmission cycle can be adjusted to the corresponding requirements for real-time communication or open Internet capable communication. It is of course also possible to change the duration of a transmission cycle and/or the duration of the part of a transmission cycle provided for transmitting real-time critical data depending on the requirement. This is advantageously done before the start of a transmission cycle, e.g., at fixed instants planned in advance and/or based on a planned number of transmission cycles, by switching to other planned real-time critical transmission cycles. Advantageously, a transmission cycle ranges between one microsecond and ten seconds, depending on the application.

A further embodiment of the invention is characterized in that the real-time communication can be reconfigured at any time during ongoing operation of an automation system to ensure flexible adaptation of the real-time control to rapidly changing boundary conditions. This, too, makes it possible to change the duration of a transmission cycle.

Another embodiment of the invention is characterized in that a portion of the part of the transmission cycle provided for the real-time critical data is reserved for transmitting data for organizing the data transmission. A particular advantage is that the data packets for organizing the data transmission are transmitted at the beginning of the part of the transmission cycle for transmitting real-time critical data. Data for organizing the data transmission are, for example, data for time synchronization of the users and coupling units of the data network, data for network topology identification, etc.

Another embodiment of the invention is characterized in that for all the real-time critical data packets to be transmitted, the transmit and receive instants are recorded in the transmitter and/or receiver, and all the instants for forwarding the real-time critical data packets and the associated connection links over which the real-time critical data packets are forwarded are recorded in all the coupling units involved before the start of the corresponding data transmission. In other words, information as to when and to which output port a real-time critical data packet arriving at an instant X should be forwarded is recorded in a coupling unit.

Yet another embodiment of the invention is characterized in that the forwarding instants are planned such that each real-time critical data packet arrives at the respective coupling unit no later than by the forwarding instant, or earlier, but in any case will not be forwarded until the forwarding instant. This eliminates the problem of time fuzziness, which is noticeable particularly with long transmission sequences. As a result, the real-time critical data packets can be transmitted or forwarded directly, without any time gap, i.e., a less efficient use of the bandwidth for real-time data packets is avoided. If necessary, transmit pauses can of course be introduced between the transmission of individual data packets.

A further advantage of time-based forwarding is that finding the target in the coupling unit is no longer address-based because it is clear in advance to which port the data packet is to be forwarded. This enables optimal use of all existing transmission links within the switchable data network. This has the advantage that if any mobile users are present in the data network, it is possible to take into account the coupling unit through which a mobile user can currently be reached over a wireless transmission link. On the other hand, redundant transmission links of the switchable data network, which may not be used for the address-based throughput of non real-time critical communication because this would lead to circularities of data packets, can be taken into account in advance in the planning of the forwarding paths and can thus be used for real-time communication. This makes it possible to realize redundant network topologies, e.g., rings for fault-tolerant real-time systems. Data packets can be redundantly transmitted on disjoint links; circularities of data packets do not occur. A further advantage of preplanned forwarding is that it enables each partial link to be monitored without acknowledgement and thereby simplifies error diagnosis.

In another exemplary embodiment of the invention, at least one arbitrary user, particularly a user having the capacity for open Internet compatible communication, with or without associated coupling unit, can be added to a switchable data network. It is thereby ensured that critical data is successfully transferred at the desired instant even if the arbitrary user carries out non real-time critical communication, particularly Internet communication in parallel to real-time critical communication.

A further embodiment of the invention is characterized in that a coupling unit is integrated into a user. This provides a significant cost advantage compared to the current stand-alone coupling units, also referred to as switches.

In another embodiment of the invention, a coupling unit has two separate accesses to the respective user. One access is provided for the exchange of real-time critical data and the other for the exchange of non real-time critical data. This has the advantage that real-time critical and non real-time critical data are processed separately. The access for the non real-time critical data corresponds to the commercially available interface of a regular Ethernet controller, so that existing software, particularly drivers, can be used without restriction. The same applies to currently existing software for a non real-time capable data network.

BRIEF DESCRIPTION OF THE DRAWINGS

The invention will now be described and explained in greater detail with reference to the exemplary embodiments depicted in the drawings, in which.

DETAILED DESCRIPTION OF THE EXEMPLARY EMBODIMENTS

Figure 1:
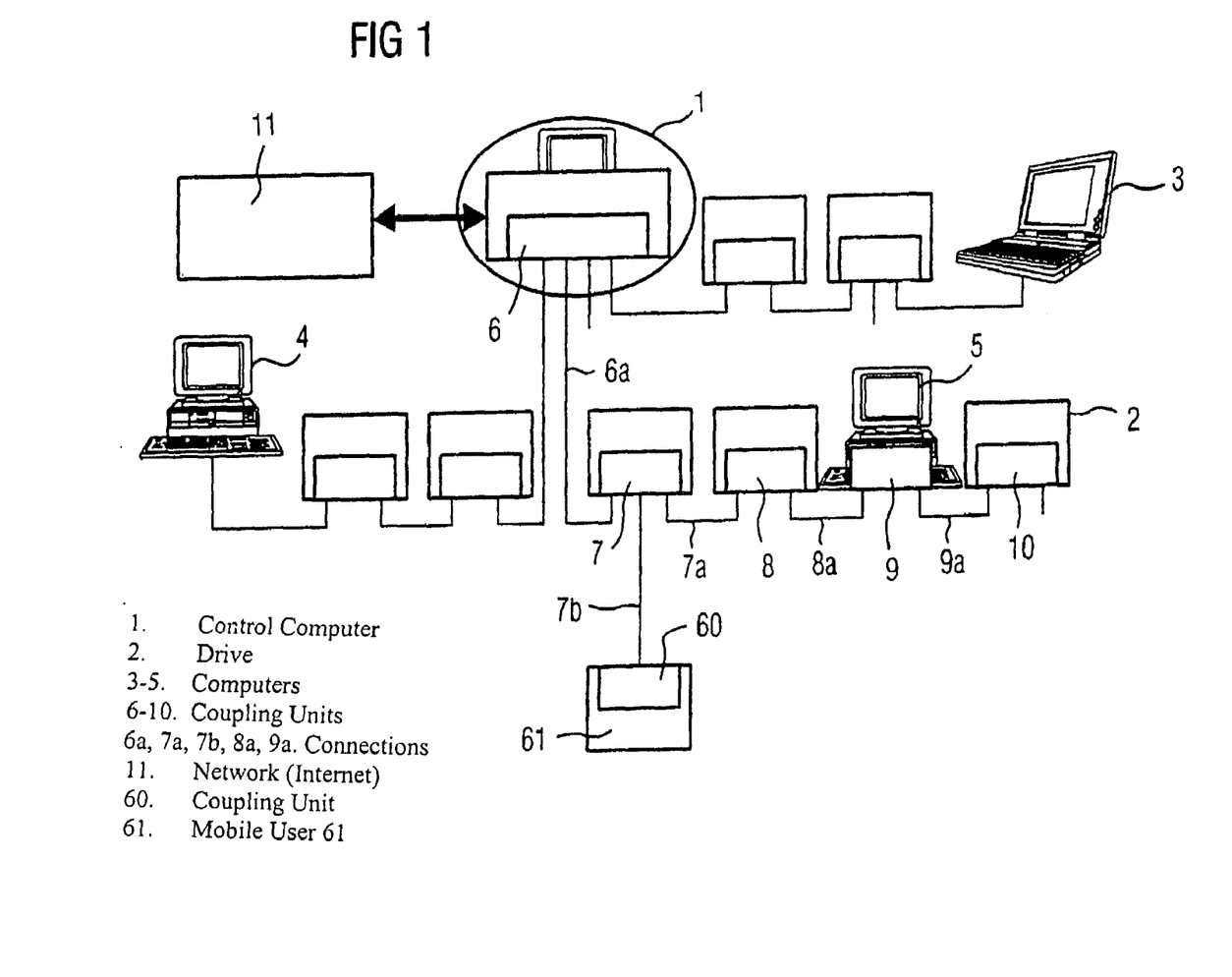
FIG. 1 is a schematic representation of an exemplary embodiment of a distributed automation system.

FIG. 1 is a schematic representation of an exemplary embodiment of a distributed automation system. For reasons of clarity and as part of the invention, each coupling unit is in this embodiment is already integrated in the respective user. In the related art, by contrast, each of the coupling units, which is already integrated in the respective local user here, is a stand-alone device that is inserted between two users. The integration of the respective coupling unit in a user is more cost-effective and easier to maintain.

The depicted automation system has a plurality of users that can simultaneously be transmitters and receivers, e.g., a control computer 1, a plurality of drives (only drive 2 is identified), a mobile user 61 and additional computers 3, 4, 5, which are interconnected into a switchable data network, particularly Ethernet, by connecting cables, particularly Ethernet cables, or by radio links. For reasons of clarity, only the connections 6a, 7a, 7b, 8a, 9a are indicated. In this figure, the coupling units, which are typical of the topology of an Ethernet, are already integrated in the respective users. For reasons of clarity, only the coupling units 6, 7, 8, 9, 10 and 60 are identified. The coupling units serve to transmit and/or receive and/or forward the data to be transmitted.

In the exemplary embodiment shown, the two connections 7a and 7b between the coupling unit 7 and the coupling unit 8 or between the coupling unit 7 and the coupling unit 60 of the mobile user 61 are wireless transmission links, which have a lower transmission rate than the other connections with wire-bound data transmission. For this purpose, the coupling units 8 and 60 each have one radio module, while the coupling unit 7 has two radio modules to enable duplex transmission. To prevent mutual interference with the radio signals, separate radio channels may be used for each transmission direction and each connection. As an alternative to the described radio connections, it is of course also possible to use light, particularly infrared light, sound or other signal types to transmit the data via wireless transmission links.

The control computer 1 is connected, for example, to a corporate communication network, e.g., intranet 11 and/or the worldwide communication network, Internet 11. The control computer 1 transmits real-time critical data over connections 6a, 7a, 8a, 9a in order to control, e.g., the drive 2. The drive 2 must process these real-time critical data exactly at the instant X to prevent the occurrence of undesirable effects, e.g., the delayed startup of the drive 2, etc., which would interfere with the functioning of the automation system. The coupling units 6, 7, 8, 9 respectively forward the real-time critical data up to the coupling unit 10, which transfers the data to the receiver drive 2, which processes the data at the instant X. In the related art, successful real-time critical data traffic of the above-described type can be ensured if no other random communication occurs at the same time, e.g., Internet communication by the computer 5. In the event of Internet communication by the computer 5, computer 5 requests, for example, an Internet page. The coupling units 9, 8 and 7 forward this non real-time critical data via the connections 8a, 7a, 6a to the coupling unit 6, which transfers the data to the computer 1. Finally, the computer 1 transmits the corresponding query to the Internet 11 and returns the response to the computer 5 in the reverse sequence via the same connections or coupling units. The response thus uses the same path as the real-time critical communication. This may result in wait times in the coupling units involved, so that the real-time critical data may no longer arrive in time at the drive 2. A fault-free real-time operation can therefore no longer be guaranteed in the related art. The use of the disclosed invention, in contrast, enables any non real-time communication to take place in parallel to the real-time communication in the same data network without interfering with the real-time communication. This is indicated by the connection of the computers 3 and 4, which do not have an integrated coupling unit but are integrated into the depicted automation system by a direct Ethernet connection. The computers 3 and 4 do not participate in real-time communication, only in spontaneous Internet capable non real-time critical communication, without interfering with the real-time communication.

The invention is based on the concept of separating real-time critical from non real-time critical communication in switchable data networks, such that the non real-time critical communication does not interfere with the real-time critical communication. A prerequisite for this separation is, on the one hand, that time synchronization is used to always synchronize all the users and coupling units of the switchable data network to a common time basis. This may be ensured by continuously using the synchronization method described, for example, in German Laid Open Application DE 100 04 425 A1 even during ongoing operation of a distributed automation system. The second prerequisite for the separation is the plannability of real-time critical communication. Plannability is ensured because real-time communication in the fields of application considered here, particularly drive engineering, is cyclical, i.e., data transmission occurs in one or more transmission cycles.

Figure 2:
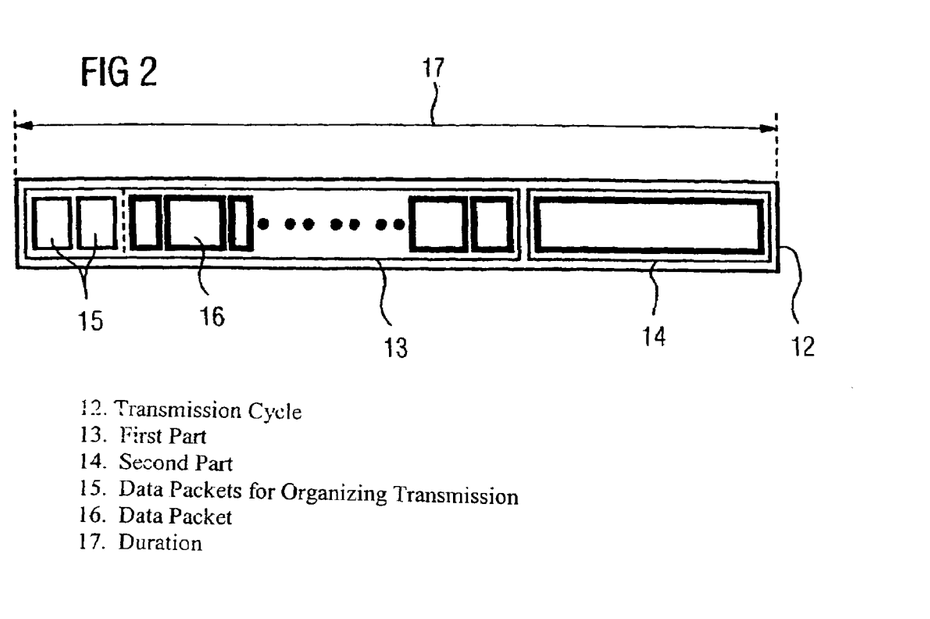
FIG. 2 illustrates the basic structure of a transmission cycle.

FIG. 2 illustrates the basic structure of a transmission cycle, which is divided into two parts. A transmission cycle 12 is divided into a first part 13, which is provided for the transmission of real-time critical data, and a second part 14, which is provided for the transmission of non real-time critical data. The length of the depicted transmission cycle 12 symbolizes its duration 17, which depending on the field of application ranges between one microsecond and ten seconds. The duration 17 of a transmission cycle 12 can be changed but is defined at least once prior to the instant when the data are transmitted, e.g., by the control computer 1. The duration 17 of a transmission cycle 12 and/or the duration of the first part 13 provided for the transmission of real-time critical data can be changed at any time, e.g., at previously defined fixed instants, and/or after a defined number of transmission cycles, preferably before the start of a transmission cycle 12, in that the control computer 1 switches, for example, to another planned real-time critical transmission cycle. Furthermore, the control computer 1 can reconfigure the real-time communication at any time if required during ongoing operation of an automation system, whereby the duration 17 of a transmission cycle 12 can also be changed. The absolute duration 17 of a transmission cycle 12 is a measure of the time-based share or the bandwidth of the non real-time critical communication during a transmission cycle 12, i.e., the time available for the non real-time critical communication. Thus, the non real-time critical communication requires 30% of the bandwidth for a duration 17 of a transmission cycle 12 of 500 µs and 97% of the bandwidth for 10 ms. In the first part 13 provided for the transmission of real-time critical data, a certain amount of time is reserved for the transmission of data packets for organizing the data transmission 15, before the actual real-time critical data packets are transmitted. For the sake of clarity only the data packet 16 is indicated. The data packets for organizing the data transmission 15 contain, for example, time synchronization data to synchronize the users and coupling units of the data network and/or data to identify the topology of the network. After these data packets have been transmitted, the real-time critical data packets—data packet 16—are transmitted. Since the real-time communication can be planned in advance because of the cyclic nature of the operation, the transmit instants or the forwarding instants of the real-time critical data packets are known for all the real-time critical data packets—or data packet 16—to be transmitted in a transmission cycle 12, before the start of data transmission. In other words, the duration of the part 14 for transmitting non real-time critical data is defined automatically by the duration of the part 13 for transmitting real-time critical data. The advantage of this arrangement is that only the time necessary to transmit the real-time critical data traffic is used. The time remaining thereafter is automatically available for non real-time critical communication, e.g., for non-plannable Internet communication or other non real-time critical applications. It is particularly advantageous that the duration of part 13 for transmitting real-time critical data is determined, respectively, by the data to be transmitted for a specific connection. In other words, the duration of the two parts is determined for each individual data connection by the required data volume of the real-time critical data to be transmitted. As a result, the time division of part 13 and part 14 for each individual data connection can differ for each transmission cycle 12. Only the necessary transmission time is used for the real-time critical data traffic, and the remaining time of a transmission cycle 12 is automatically available for non real-time communication, e.g., for non-plannable Internet communication or other non real-time critical applications to all the users of the switchable data network. The real-time communication is planned in advance, such that the arrival of the real-time critical data packets at the corresponding coupling units is scheduled so that the real-time critical data packets, e.g. data packet 16, arrive at the corresponding coupling units no later than by the forwarding instant, or before. As a result, the real-time critical data packets, or data packet 16, can be transmitted or forwarded without any time gap, such that densely packed transmission or forwarding makes optimal use of the available time. If necessary, it is of course also possible to incorporate transmit pauses between the transmission of the individual data packets.

Figure 3:
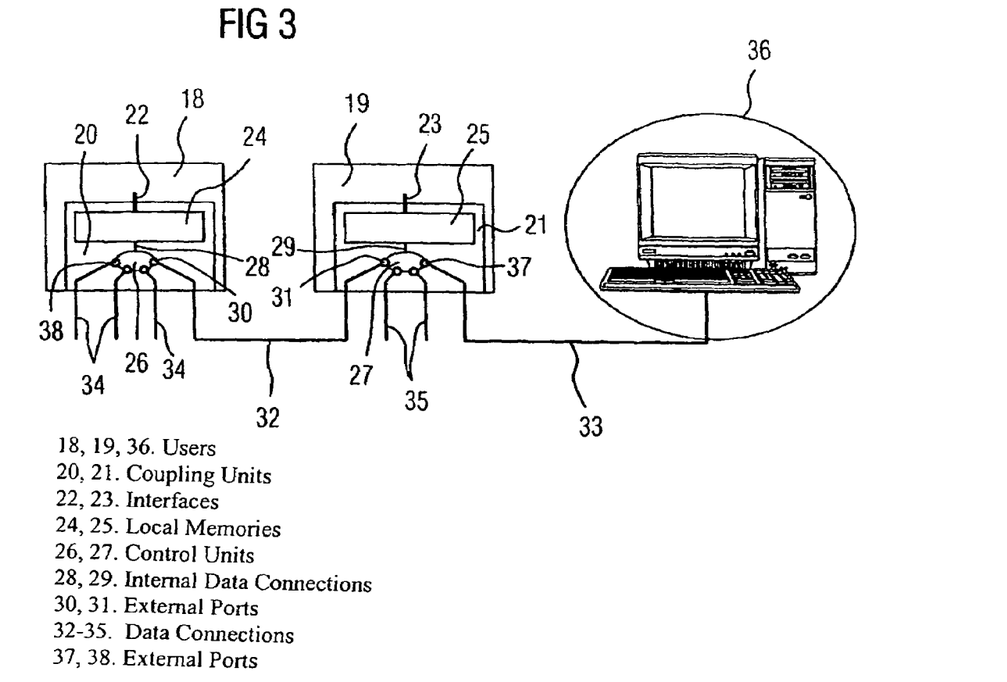
FIG. 3 illustrates the basic method of operation in a switched network.

FIG. 3 illustrates the basic mode of operation in a switched network. By way of example, the Figure shows a network including a user 18, e.g., a drive, and a user 19, e.g., a control computer, each with integrated coupling units 20, 21, and a further user 36 without a coupling unit, which are interconnected by data connections 32, 33. The coupling unit 20 is connected to the coupling unit 21 via the external port 30, the data connection 32 and the external port 31. For reasons of clarity, the other external ports of the coupling units 20, 21 are not identified. For the same reason, other users with or without integrated coupling unit are not shown. Data connections 34, 35 from the depicted coupling units 20, 21 to other users are only suggested. The coupling units 20, 21 have local memories 24, 25, which are connected to the users 18, 19 via the internal interfaces 22, 23. The users 18, 19 exchange data with the corresponding coupling units 20, 21 via the interfaces 22, 23. Within the coupling units 20, 21, the local memories 24, 25 are connected to the control units 26, 27 via the data connections 28, 29. The control units 26, 27 receive or forward data from or to the local memories 24, 25 via the internal data connections 28, 29 or via one or more of the external ports, e.g., port 30 or port 31. By using the time synchronization method, the coupling units 20, 21 are always synchronized to a common time basis. If the user 21 has real-time critical data, these data are fetched from the control unit 27 at the preplanned instant during the part reserved for real-time critical communication via the interface 23, the local memory 25 and the connection 29. From there they are transmitted to the coupling unit 20 via the defined external port, e.g., port 31. If at the same time, i.e., during real-time critical communication, the user 36 is transmitting non real-time critical data, e.g., for an Internet query using the data connection 33, this data is received by the control unit 27 via the external port 37 and forwarded via the internal connection 29 to the local memory 25 where it is temporarily stored. From there it is fetched again during the part for non real-time critical communication and forwarded to the recipient. In other words, the data are shifted to the second part of the transmission cycle, which is provided for spontaneous non real-time critical communication, so that interference with real-time communication is excluded. In the event that not all buffered non real-time critical data can be transmitted during the part of a transmission cycle provided for the transmission of non real-time critical data, the data are temporarily stored in the local memory 25 of the coupling unit 21 until they can be transmitted during a part of a subsequent transmission cycle provided for the transmission of non real-time critical data, such that interference with real-time communication is excluded in any case.

The real-time critical data packets arriving at the control unit 26 of the coupling unit 20 via data connection 32 and the external port 30 are immediately forwarded via the corresponding external port. This is possible because the real-time communication is planned in advance so that the transmit and receive instants, all the coupling units involved, all the forwarding instants and all the recipients of the real-time critical data packets are known for all the real-time critical data packets to be transmitted. In other words, it is recorded in, e.g., the control unit 26 of the coupling unit 20 that the real-time critical data packets arriving at the instant X are to be forwarded to the next coupling unit via the external port 38. The advance planning of real-time communication also ensures that no data collision occurs, e.g., on the data connection 34 from port 38. The same is of course also true for all the other data connections or ports during real-time communication. The forwarding instants of all the real-time critical data packets from the coupling units involved are likewise planned in advance and are thus uniquely defined. The arrival of the real-time critical data packets, e.g., at the control unit 26 of the coupling unit 20 is therefore planned such that the real-time critical data packets arrive at the control unit 26 of the coupling unit 20 no later than by the forwarding instant, or before. This eliminates the problem of time fuzziness, which is noticeable particularly in long transmission sequences. Data addressed, for example, to the user 18 and buffered in the local memory 24 of the coupling unit 20 are fetched from this memory at the appropriate time, real-time critical data at the predefined instants and non real-time critical data during the part of the transmission cycle defined for this purpose.

Hence, as described above, simultaneous real-time critical and non real-time critical communication in the same switchable data network and an arbitrary connection of additional users to the switchable network are possible without interfering with the real-time communication itself.

Figure 4:
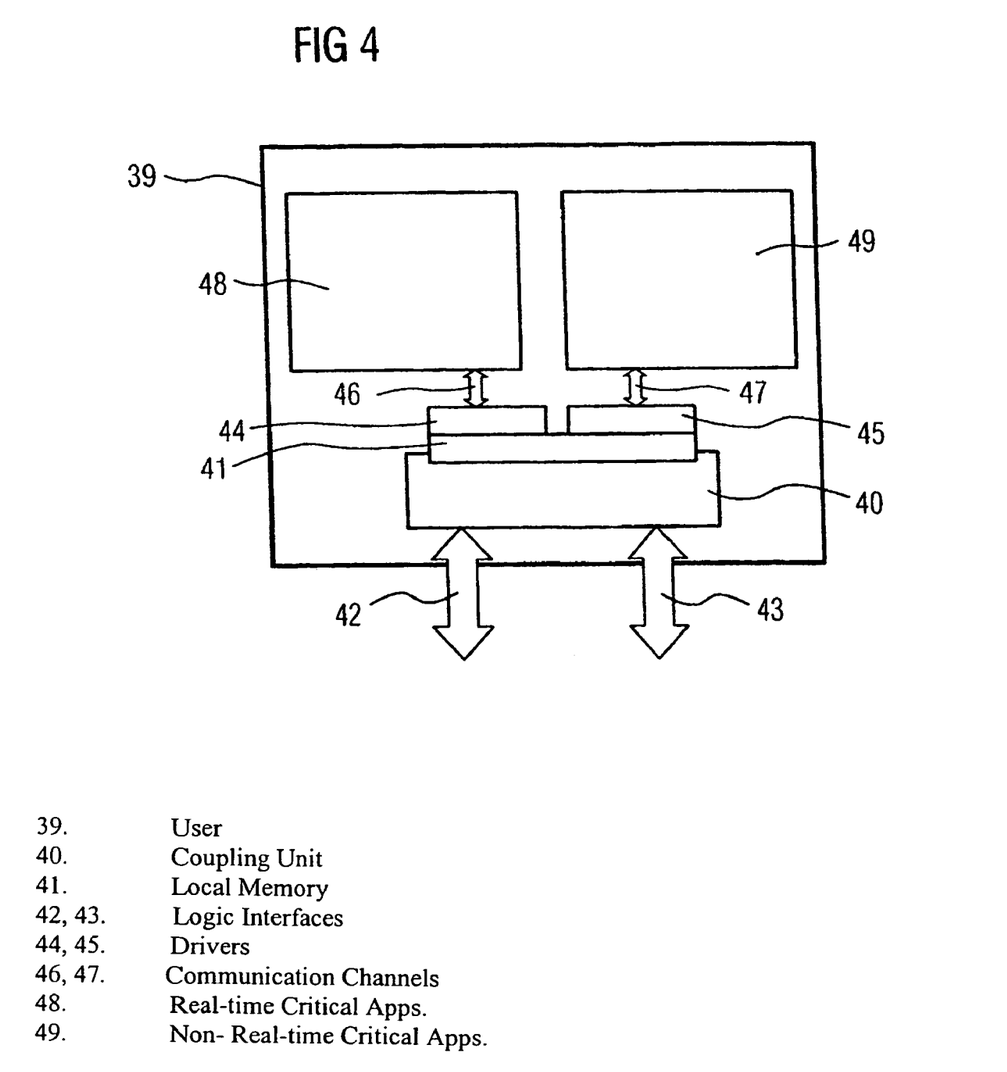
FIG. 4 is a schematic representation of the interfaces between a local user and a coupling unit.

FIG. 4 is a schematic representation of the interfaces between a local user and a coupling unit. The coupling unit 40 according to the disclosed invention is integrated in the user 39, e.g., a control computer 1 of an automation system. The user 39 takes part in both real-time critical and non real-time critical communication. Thus real-time critical applications 48, e.g., for controlling the drives of an automation system, and non real-time critical applications 49, e.g., browsers for spontaneous Internet communication, or word processing programs are installed in the user 39. For the sake of clarity, FIG. 4 shows only logical connections, no physical connections, particularly data connections. The user 39 and the integrated coupling unit 40 communicate via the local memory 41 in which the corresponding data transmitted by the user or data addressed to the user 39 are buffered. Both the user 39 and the coupling unit 40 must be able to access the local memory 41. The physical location of the local memory 41, which in the exemplary embodiment shown is part of the coupling unit 40, is irrelevant. To ensure the separation between real-time critical and non real-time critical communication and thus interference-free real-time communication, two separate accesses to the user 39 are required. One access is provided for exchanging real-time critical data and the other for exchanging non real-time critical data. Thus, physical communication takes place via two separate logic interfaces 42 and 43 between the data network (not shown) and the coupling unit 40, and via the logically separate communication channels 46 and 47 between the memory 41, i.e., the coupling unit 40, and the user 39. The interface 42 and the communication channel 46 embody the communication channels for the real-time critical communication. The interface 43 and the communication channel 47 embody the communication channels for the non real-time critical communication. Physically, however, the two logically separate interfaces 42 or 43 and the communication channels 46 or 47 are the same communication channel used, respectively, to transmit the corresponding data in the two directions. In particular, the signaling, which indicates which type of data are present and can be fetched over the two logically separate communication channels 46 and 47, is separate. The availability of real-time critical data for the real-time critical applications 48 is signaled over the communication channel 46, while the availability of non real-time critical data for the non real-time critical applications 49 is signaled over the communication channel 47. This allows drivers 44 and the real-time critical applications 48 to be processed with a higher priority than drivers 45 and the non real-time critical applications 49. As a result, real-time capable processing of the real-time critical data can also be guaranteed in the user 39. The separation of the real-time critical communication from the non real-time critical communication, which is necessary to ensure real-time communication, has the further advantage that programs for non real-time critical communication, particularly existing drivers, can be used without restriction. Thus, on the one hand, no expensive new developments are necessary and, on the other hand, the continued evolution of standard non real-time critical communication has no influence on the real-time communication, per se and can therefore be included in the disclosed invention without restriction.

Figure 5:
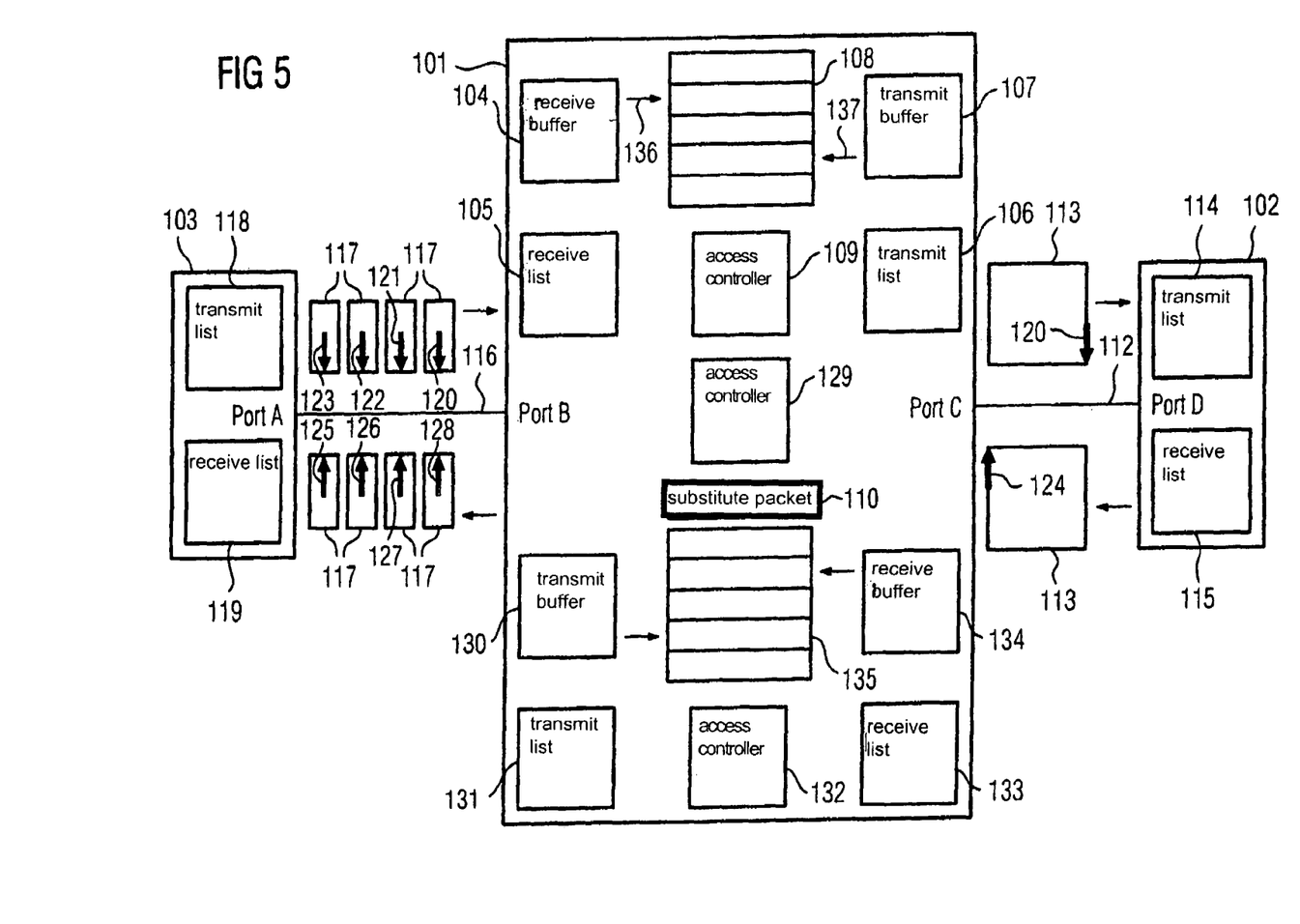
FIG. 5 is a block diagram of one embodiment of an electronic circuit and corresponding communication connections between two users of networks differing in performance.

FIG. 5 shows an electronic circuit 101 used as the communication interface between a communication connection 112 to a coupling unit 102 and a communication connection 116 to a coupling unit 103. Hereinafter, the electronic circuit of a coupling unit, the communication interface realized thereby and the coupling unit are often referred to as coupling nodes according to their function.

The coupling node 101 has the two communication ports B and C.

The port B is assigned a receive list 105. The receive list 105 determines the data packets to be received at the port B at different instants from the various other nodes of the communication system. The type, the instant and the addressee of the data packets are thus determined in advance. Only the user data to be transported by the data packets change.

The port B is further assigned a receive buffer 104. The receive buffer is used as a buffer memory for the full receipt of at least one data packet. For this purpose, the size of the receive buffer 104 is sufficient to receive at least one full data packet of a maximum length.

The port C has a transmit list 106, which in the deterministic communication system defines which data packets are to be transmitted at which instants to which recipient of the coupling node 101 at the coupling node's port C. The port C is assigned a transmit buffer 107, which is used to buffer a data packet to be transmitted. Similarly to the receive buffer 104, the transmit buffer 107 must have a size sufficient to hold at least one data packet of a predefined maximum length.

An intermediate memory 108 is located between the receive buffer 104 and the transmit buffer 107. The intermediate memory 108 is used to temporarily store fully received data packets. Both the receive buffer 104 and the transmit buffer 107 can access the intermediate memory 108. The corresponding accesses are controlled by an access controller 109, a so-called arbiter.

As soon as a data packet has been fully received in the receive buffer 104, a request to copy the full data packet present in the receive buffer 104 to the intermediate memory 108 is sent to the access controller 109. The intermediate memory 108 is divided into different memory areas, e.g., by lines. The individual memory areas are identified by a write pointer 136 and a read pointer 137.

The data packet that has been fully received in the receive buffer 104 is then stored in the area of the intermediate memory 108 identified by the current position of the write pointer 136. The position of the write pointer 136 is incremented in the corresponding memory area after the write operation, such that the write pointer 136 then points to the next free memory area.

As soon as the read pointer 137 points to the memory area of the previously stored data packet, the data packet is transferred from the intermediate memory 108 to the transmit buffer 107, from where it is transmitted according to the transmit list 106. After the transfer of the corresponding non real-time data packet from the intermediate memory 108 to the transmit buffer 107 the position of the read pointer 137 is incremented according to the transmit list 106 to be processed.

According to an alternative embodiment, the transmit list 106, for each element to be transmitted, includes an address of the intermediate memory 108 from which the data packet is to be fetched. Correspondingly, in this alternative embodiment, the control structure of the receive list, for each element to be received, can also include an address of the intermediate memory 108 at which a corresponding fully received data packet is to be temporarily stored.

The coupling node 101 is connected to the node 102 via a communication connection 112. The communication connection 112 is a low-performance connection with wireless data transmission, e.g. by radio, with a relatively low data rate and a relatively long transmission cycle 113, which is also referred to as a frame.

The communication connection 112 connects the port C to a port D of the node 102. The port D is assigned a transmit list 114 and a receive list 115, which in turn specify the deterministic transmission of data packets via the communication system, i.e., the communication connection 112.

Correspondingly, the port B of the coupling node 101 is connected to a port A of the node 103 via a communication connection 116. The communication connection 116 is a high-performance connection with a relatively high data rate and a relatively short transmission cycle 117 with wire-bound data transmission, e.g., Fast Ethernet.

The port A of the node 103, in turn, has a transmit list 118 and a receive list 119 for the deterministic transmission of data packets from or to the node 103.

Communication via the communication connections 112 and 116 occurs in the cyclically repeated transmission cycles 113 or 117, which, in turn, can be divided into time slots. During a transmission cycle 113 or 117 the corresponding receive and transmit lists are processed, such that different data packets are assigned to the corresponding time slots in a transmission cycle.

The example of FIG. 5 shows four successive transmission cycles 117 in which one or more data packets are transmitted. For the sake of clarity, FIG. 5 shows only one data packet 120, 121, 122 or 123 for each transmission cycle 117.

Due to the "store and forward" method used in the coupling node 101, the communication connections 112 and 116 do not need to be synchronized. This means that the start of the transmission cycles 113 and 117 can be phase shifted. Likewise, the length of the transmission cycles 113 and 117 can be selected at will, i.e., there is no restriction as to an equal length or an integral multiple. However, the maximum packet length in the deterministic communication system must be defined such that a corresponding data packet can be transmitted within one transmission cycle 113 or 117 to ensure consistency of the data, particularly of real-time data.

In a second application case, the node 102 transmits a data packet 124 in the transmission cycle 113 according to the node's transmit list 114 via the communication connection 112 from the node's port D to the port C of the coupling node 101. The data packet 124 is received by the port C of the coupling node 101 according to that node's receive list 133 and is temporarily stored in the receive buffer 134.

The coupling node 101 then transmits data packets 125, 126, 127 or 128 from its port B according to its transmit list 131 during the subsequent transmission cycles 117. This can be done in this manner because the data packets 125 to 128 are each a copy of the data packet 124. This satisfies the requirements of the receive list 119, which expects a data packet in each data slot of the transmission cycle 117.

As an alternative, a substitute packet, which does not carry any user information, can be stored in the memory 110. In this case, only one of the data packets 125 to 128, e.g., the data packet 125, is a copy of the data packet 124 while the other data packets 126 to 128 are copies of the substitute packet of the memory 110. This process can be monitored, for example, by the controller 132.

Thus, overall, if a data packet is transmitted n times from the node 103, e.g. four times, this data packet is transmitted m times from the node 101 to the node 2, where m<n, preferably m=1, as in this example.

On the other hand, if a data packet is transmitted n times via the low-performance communication connection 112, this data packet is repeated m times. In other words, in the present example, there is a four-time repeat for a one-time transmission, or the transmitted data packet is transmitted only once and m−1 substitute packets are transmitted in addition.

The coupling node 101 further has a coupling field 129 via which communication connections can be established in the coupling node 101 between the ports B and C and, if required, other ports of the coupling node 101 (not depicted).

The coupling node 101 itself can be an integral component of an automation component.

Figure 6:
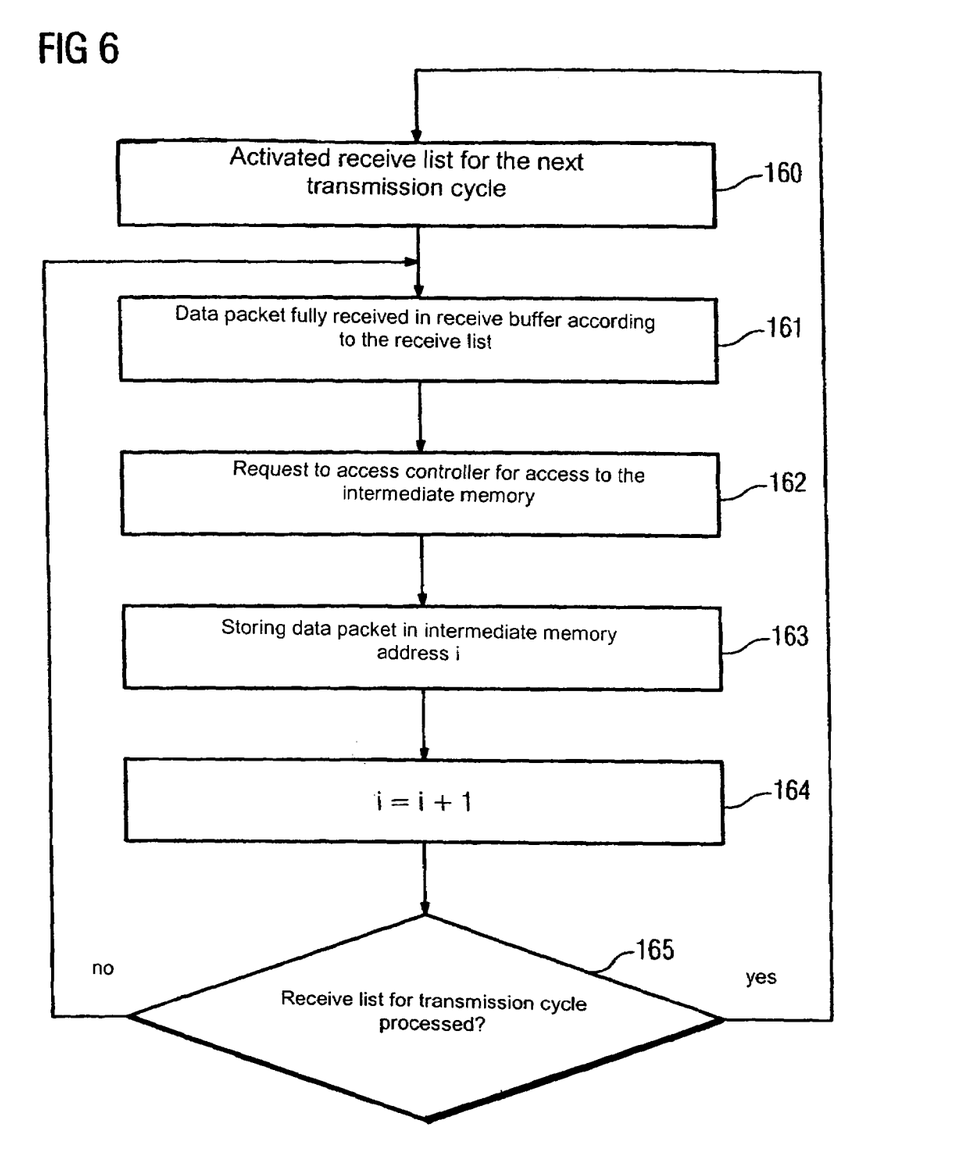
FIG. 6 is a flow diagram of an exemplary embodiment of the receiving method.

FIG. 6 shows a corresponding flow diagram for the receipt of a data packet at a port of the coupling node. In step 160, the receive list of the corresponding port is activated for the next transmission cycle of the respective communication connection. In step 161 a data packet is fully received according to the receive list via the communication connection. This data packet is temporarily stored in the receive buffer.

Access to the intermediate memory is requested from the access controller in step 162. After the access controller has sent a corresponding signal, the respective data packet is stored in the intermediate memory in a memory area with the address i in step 163. The address i is identified by a write pointer of the intermediate memory.

This address i is incremented in step 164, such that the write pointer points to the next free storage area of the intermediate memory. This may also involve a so-called rollover.

If the receive list for this transmission cycle has already been processed with the receipt of this data packet, the sequencer returns to step 160 to activate the receive list for the next transmission cycle. If not, the sequencer returns from the decision step 165 to step 161 to receive subsequent data packets according to the same receive list in the current transmission cycle.

Figure 7:
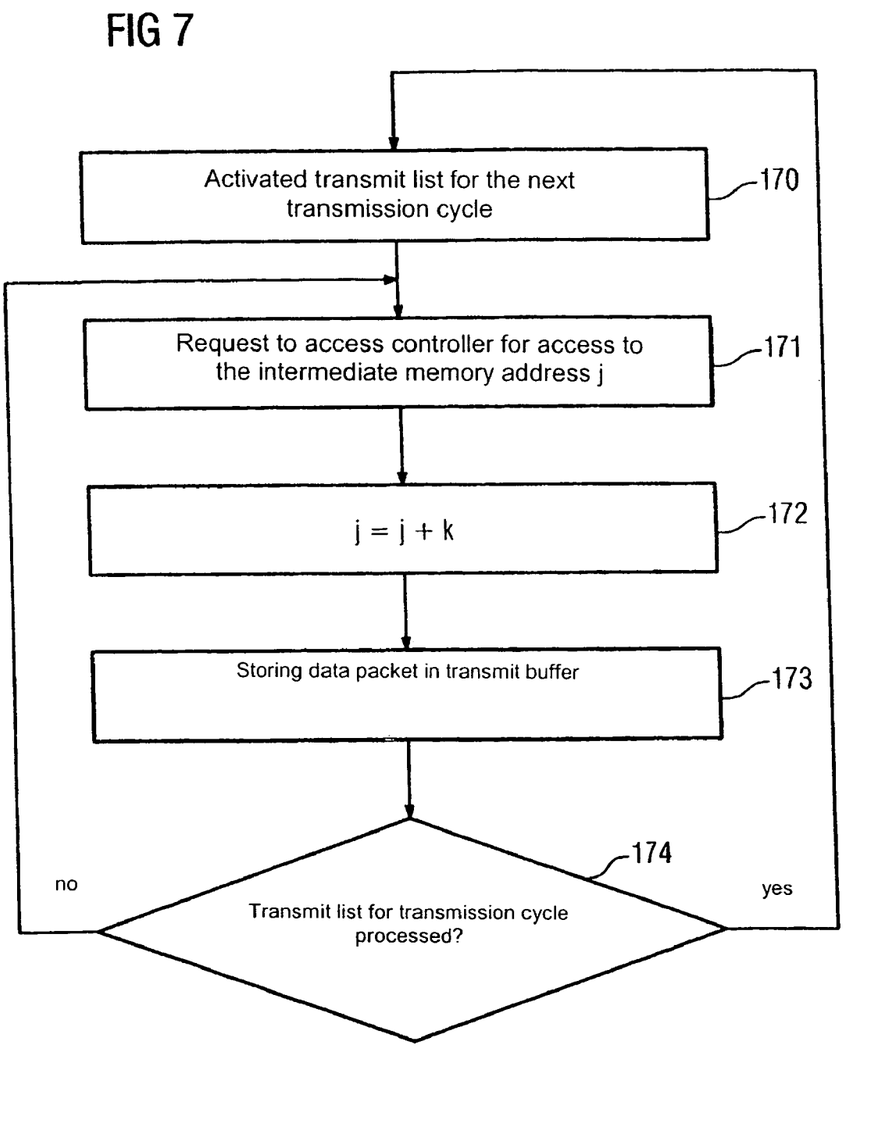
FIG. 7 is a flow diagram of an exemplary embodiment of the transmission of a data packet from a low-performance to a higher-performance network.

FIG. 7 shows the corresponding situation for transmitting from another port of the coupling node. First, in step 170, the corresponding transmit list is activated for the next transmission cycle. In step 171, access to the intermediate memory is requested from the access controller to transfer the next non real-time data packet to be transmitted into the transmit buffer and to transmit it from there. A read pointer of the intermediate memory identifies the corresponding memory area of the address j in the intermediate memory. After the access controller has allowed access to the memory area with the address j in the intermediate memory by a corresponding signal, the read pointer is incremented by an amount k in step 172 and the data packet is transferred to the transmit buffer in step 173.

The amount k by which the read pointer is incremented is defined by the transmit list. The access controller ensures that the read pointer does not overtake the write pointer or vice versa.

From the subsequent step 174 the program jumps back to step 170 if the processing of the transmit list for the current transmission cycle is completed with the transmission of the data packet. If not, the program goes to step 171 to transmit other data packets according to the transmit list in the current transmission cycle.

In summary, the invention relates to a system and a method enabling both real-time critical and non real-time critical communication through cyclic operation in a heterogeneous switchable data network made up of users and coupling units, e.g., a distributed automation system. At least one part (13) of a so-called transmission cycle (12) is provided for all the users and coupling units of the switchable data network to transmit real-time critical data. At least one part (14) is provided for the transmission of non real-time critical data. Thus, the real-time critical communication is separate from the non real-time critical communication. Because all the users and coupling units are always synchronized to a common time basis, the respective parts for transmitting data occur at the same instant for all the users and coupling units. This means that real-time critical communication is time independent from non real-time critical communication and is therefore not influenced by the latter. Real-time critical communication is planned in advance. The feeding of the data packets at the original transmitter and their forwarding by means of the coupling units involved is time-based. Intermediate storage in the respective coupling units makes it possible to shift any spontaneous Internet capable non real-time critical communication, which can occur at any time, to the part (14) of the transmission cycle (12) that is provided for the non real-time critical communication and to transmit it only in that part.

The above description of the exemplary embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A method for transmitting data over a switchable data network, in which real-time critical and non real-time critical data are transmitted, comprising:

transmitting the data by a computer in at least one transmission cycle with an adjustable duration, each transmission cycle divided into at least one first part for transmitting the realtime critical data for real-time control and at least one second part for transmitting the non real-time critical data; and establishing a communication interface by a computer between a first communication connection on a first transmission link with a first transmission cycle of a first length and a second communication connection on a second transmission link with a second transmission cycle of a second length, said establishment comprising:

receiving a data packet comprising the realtime critical data according to a receive list assigned to the first transmission cycle, temporarily storing the received data packet comprising real-time critical data, and transmitting the stored data packet comprising the real-time data critical data according to a transmit list assigned to the second transmission cycle, wherein the data in the first and the second communication connections are exchanged in equidistant communication cycles.

2. The method as claimed in claim 1, wherein the computer that performs the establishment of the communication interface is a coupling unit, which connects a first transmission link with wireless data transmission, and a second transmission link with wire-bound data transmission.

3. The method as claimed in claim 1, wherein at least one user transmits data over the switchable data network, wherein each of the at least one user is assigned a coupling unit, which at least one of transmits, receives, and forwards the data to be transmitted.

4. The method as claimed in claim 1, wherein data packets comprising real-time critical data received in the first transmission cycle are stored in successive memory areas of the intermediate memory.

5. The method as claimed in claim 1, wherein data packets comprising real-time critical data to be transmitted in the second transmission cycle are read from the intermediate memory, wherein the respective memory areas are separated from each other by an offset.

6. The method as claimed in claim 1, wherein an access controller ensures that during a logic time unit, no access occurs to a same memory area for temporarily storing a received, non real-time data packet and transmission of the received, non real-time data packet.

7. The method as claimed in claim 1, wherein at least one of the first communication connection and the second communication connection have different transmission rates, the first and the second transmission cycle are asynchronous, and the first and the second length are the same or different or have any integral or non-integral ratio.

8. The method as claimed in claim 7, wherein the real-time critical data packet is transmitted only once in the second transmission cycle and a substitute data packet is transmitted m-1 times in subsequent second transmission cycles.

9. The method as claimed in claim 1, wherein the real-time critical data packet is received from a first user of the first communication connection within the first transmission cycle, and the real-time critical data packet is transmitted m times within m successive transmission cycles to a second user of the second communication connection.

10. The method as claimed in claim 1, wherein the Industrial Ethernet is an isochronous real-time Ethernet, a real-time Fast Ethernet, or a combination thereof.

11. The method as claimed in claim 1, wherein the first and the second communication connections are each an Industrial Ethernet.

12. The method as claimed in claim 1, wherein a plurality of at least one of input and output ports, each of which is assigned a receive and/or transmit list, is coupled via a coupling field.

13. The method as claimed in claim 1, wherein the first and second transmission cycles have no phase shift.

14. The method as claimed in claim 1, wherein at least two users are connected to coupling units and transmit data over the switchable data network, the users and the coupling units of the switchable data network are always synchronized to a common synchronous time basis through time synchronization.

15. The method as claimed in claim 1, wherein the non real-time critical data which are to be transmitted during the part of a transmission cycle provided for real-time critical communication are temporarily stored by a respective coupling unit and are transmitted during the part of this or a subsequent transmission cycle provided for non real-time critical communication.

16. The method as claimed in claim 1, wherein the non real-time critical data which cannot be transmitted during the part of a transmission cycle provided for transmitting the non real-time critical data are temporarily stored by a corresponding coupling unit and transmitted during the part of a subsequent transmission cycle provided for transmitting the non real-time critical data.

17. The method as claimed in claim 1, wherein a duration of the part within a transmission cycle for transmitting the non realtime critical data is determined automatically by a duration of the part for transmitting the realtime critical data.

18. The method as claimed in claim 1, wherein a duration of the part within a transmission cycle for transmitting the realtime critical data is determined, respectively, by the data to be transmitted in a specific connection.

19. The method as claimed in claim 1, wherein the duration of a transmission cycle is determined at least once before a respective data transmission is executed.

20. The method as claimed in claim 1, wherein at least one of the duration of a transmission cycle and a duration of the part of a transmission cycle for transmitting the realtime critical data can be changed.

21. The method as claimed in claim 1, wherein the duration of a transmission cycle is in a range of between about 1 microsecond and 10 seconds.

22. The method as claimed in claim 1, wherein a realtime communication can be reconfigured at any time during an ongoing operation of an automation system.

23. The method as claimed in claim 1, wherein the duration of a transmission cycle can be changed by reconfiguring a real-time communication.

24. The method as claimed in claim 1, wherein a portion of the part of the transmission cycle provided for transmitting the real-time critical data is reserved for transmitting data for organizing the data transmission.

25. The method as claimed in claim 1, wherein data for organizing a data transmission are transmitted at the beginning of the part of the transmission cycle for transmitting the realtime critical data.

26. The method as claimed in claim 1, wherein data for organizing a data transmission comprise at least one of data to time-synchronize users and coupling units of the data network and data to detect the topology of the network.

27. The method as claimed in claim 1, wherein transmit and receive instants are recorded at one or both of a transmitter and receiver for realtime critical data packets to be transferred prior to the start of a corresponding execution of the data transmission.

28. The method as claimed in claim 1, wherein instants for forwarding realtime critical data packets and associated connection links over which the real-time critical data packets are forwarded, are recorded in associated coupling units involved prior to the start of a corresponding execution of the data transmission.

29. The method as claimed in claim 1, wherein each real-time critical data packet arrives at a corresponding coupling unit no later than by a forwarding instant, or before.

30. The method as claimed in claim 1, wherein realtime critical data packets are transmitted or forwarded without any time gap.

31. The method as claimed in claim 1, wherein connection links of a switchable data network that may not be used for non real-time critical communication are used for real-time critical communication.

32. The method as claimed in claim 1, wherein at least one user of a switchable data network can perform at least one of real-time critical communication and non realtime critical communication in parallel within a same switchable data network, wherein the non realtime critical communication does not influence the realtime critical communication taking place in parallel.

33. The method as claimed in claim 32, wherein the real-time critical communication and non realtime critical communication include Internet communications.

34. The method as claimed in claim 1, wherein at least one arbitrary user is added to the switchable data network.

35. The method as claimed in claim 34, wherein the user is added via open Internet capable communication, with or without an associated coupling unit.

36. A system for transmitting data over a switchable data network having at least one data processing unit coupled to a switchable data network over which real-time critical and non real-time critical data are transmitted, the system comprising:
transmitting means for transmitting data in at least one transmission cycle with adjustable duration, each transmission cycle being divided into at least one first part for transmitting the real-time critical data for real-time control and at least one second part for transmitting the non real-time critical data;
a coupling unit including an electronic circuit for a scalable communication interface, wherein the coupling unit is provided to connect a first transmission link with wireless data transmission and a second transmission link with wire-bound data transmission, wherein the communication interface is provided between a first communication connection on the first transmission link with a first transmission cycle of a first length and a second communication connection on the second transmission link with a second transmission cycle of a second length, having a receive list for the first transmission cycle and a transmit list for the second transmission cycle, wherein a data packet comprising the real-time critical data received according to the receive list is assigned to an element of the transmit list; and a receive buffer, a transmit buffer, and an intermediate memory for storing data packets comprising the real-time critical data received according to the receive list and the real-time critical data packets to be transmitted according to the transmit list, wherein both the receive buffer and the transmit buffer are connected to the intermediate memory and wherein the data in the first and second communication connections are exchanged in equidistant communication cycle.

37. The system as claimed in claim 36, further comprising at least one user communicating via the switchable network, wherein each of said at least one user in the system is assigned a coupling unit, which is provided for at least one of transmitting, receiving, and forwarding the data to be transmitted.

38. The system as claimed in claim 36, further comprising an access controller in the electronic circuit for controlling access by the transmit and receive buffers to the intermediate memory.

39. The system as claimed in claim 36, wherein the real-time critical data packets received in the first transmission cycle are stored in successive memory areas of the intermediate memory and the system further includes a receive pointer pointing to the respectively next free memory area for the temporary storage of a received data packet.

40. The system as claimed in claim 36, wherein the first and the second communication connections have different transmission rates and are not synchronized.

41. The system as claimed in claim 36, wherein the first and the second transmission cycles are synchronous and the first and second lengths are equal or an integral multiple of each other.

42. The system as claimed in claim 36, wherein the transmit list is configured to transmit a data packet m times within m successive transmission cycles after the data packet has been received n times according to the receive list within the first transmission cycle.

43. The system as claimed in claim 36, wherein the data packet according to the transmit list is transmitted only once and in addition, a number of m−1 substitute data packets are transmitted according to the transmit list in the second transmission cycle.

44. The system as claimed in claim 36, wherein at least one of the first and the second communication connections are bidirectional and the transmit list and the receive list are assigned to each of the bidirectional communication connections.

45. The system as claimed in claim 36 further including a plurality of at least one of input and output ports in the electronic circuit, each of which is assigned at least one of a receive list and transmit list and having a coupling field to couple one of the ports with one or more of the other ports.

46. The system as claimed in claim 36, flirt her comprising:
at least two users connected communicating via the switchable data network; and
at least one means to supply the users and the coupling units of the switchable data network with a common synchronous time basis among each other through mutual time synchronization.

47. The system as claimed in claim 36, wherein the system has at least one means to ensure that the non real-time critical data which are to be transmitted during the part of a transmission cycle provided for realtime critical communication are temporarily stored by a respective coupling unit and are transmitted during the part of the transmission cycle or a subsequent transmission cycle provided for non realtime critical communication.

48. The system as claimed in claim 36, wherein the system has at least one means to ensure that the non real-time critical data which cannot be transmitted during the part of a transmission cycle provided for the non realtime critical data are temporarily stored by the respective coupling unit and are transmitted during the part of a subsequent transmission cycle provided for the transmission of the non realtime critical data.

49. The system as claimed in claim 36, wherein the system has at least one means to automatically determine the duration of the part within a transmission cycle for transmitting the non realtime critical data based on a duration of the part for transmitting the real-time critical data.

50. The system as claimed in claim 36, wherein the system has at least one means to determine a duration of the part within a transmission cycle for transmitting the realtime critical data based on the data to be transmitted in a specific connection.

51. The system as claimed in claim 36, wherein the system has at least one means to determine the duration of a transmission cycle at least once before the corresponding execution of the data transmission.

52. The system as claimed in claim 36, wherein the system has at least one means to change at least one of the duration of a transmission cycle and the duration of the part for transmitting the real-time critical data of a transmission cycle.

53. The system as claimed in claim 36, wherein the system has at least one means to reconfigure the realtime communication at any time during the ongoing operation of an automation system.

54. The system as claimed in claim 36, wherein the system has at least one means to change the duration of a transmission cycle by reconfiguring the real-time communication.

55. The system as claimed in claim 36, wherein the system has at least one means to reserve a portion of the part of the transmission cycle provided for transmitting the real-time critical data to transmit data for organizing the data transmission.

56. The system as claimed in any claim 36, wherein the system has at least one means to transmit the data for organizing the data transmission at the beginning of the part of the transmission cycle for transmitting the real-time critical data.

57. The system as claimed in claim 36, wherein the system has at least one means to record the transmit and receive instant for the real-time, critical data packets to be transmitted at one or both of a transmitter and a receiver before the corresponding execution of the data transmission.

58. The system as claimed in claim 36, wherein the system has at least one means to record in the coupling devices involved all the instants for the forwarding of the realtime critical data packets and the associated connection links over which the real-time critical data packets are forwarded for the realtime critical data packets to be transmitted before the staff of the corresponding execution of the data transmission.

59. The system as claimed in claim 36, wherein the system has at least one means to ensure that each of the real-time critical data packets arrives at the corresponding coupling unit no later than by the forwarding instant, or before.

60. The system as claimed in claim 36, wherein the system has at least one means to transmit or forward the real-time critical data packet without any time gap.

61. The system as claimed in claim 36, wherein the system has at least one means to ensure that connection links of a switchable data network which may not be used for the non real-time critical communication are used for the real-time critical communication.

62. The system as claimed in any claim 36, wherein the coupling unit is integrated in a user.

63. The system as claimed in claim 36, further including a coupling unit, wherein the coupling unit has two separate accesses to a respective user, wherein one access is provided for the exchange of real-time critical data and the other access for the exchange of non real-time critical data.

64. The system as claimed in claim 36, wherein the system has at least one means to ensure that at least one user of a switchable data network can perform at least one of real-time critical communication and non real-time critical communication in parallel in the same switchable data network, wherein any occurring non real-time critical communication does not influence the real-time critical communication that takes place in parallel.

65. The system as claimed in claim 64, wherein the real-time critical communication and non realtime critical communication include Internet communications.

66. The system as claimed in claim 36, wherein the system has at least one means to add at least one arbitrary user to the switchable data network.

67. The system as claimed in claim 66, wherein the means to add provides for open Internet capable communication, with or without an associated coupling unit.

68. The system as claimed in claim 36, wherein the coupling unit is provided to connect a first transmission link with wireless data transmission and a second transmission link with wire-bound data transmission.

* * * * *